United States Patent
Mandanapu et al.

(10) Patent No.: US 10,637,819 B2
(45) Date of Patent: Apr. 28, 2020

(54) CONTEXT BASED MULTI-MODEL COMMUNICATION IN CUSTOMER SERVICE

(71) Applicant: Orange, Paris (FR)

(72) Inventors: Subash Mandanapu, San Bruno, CA (US); Manoj Mourya, Fremont, CA (US)

(73) Assignee: Orange, Paris (FR)

( * ) Notice: Subject to any disclaimer, the term of this patent is extended or adjusted under 35 U.S.C. 154(b) by 72 days.

(21) Appl. No.: 14/749,375

(22) Filed: Jun. 24, 2015

(65) Prior Publication Data

US 2015/0381547 A1 Dec. 31, 2015

Related U.S. Application Data

(60) Provisional application No. 62/017,651, filed on Jun. 26, 2014.

(51) Int. Cl.
| | |
|---|---|
| *G06F 15/16* | (2006.01) |
| *H04L 12/58* | (2006.01) |
| *G06Q 30/00* | (2012.01) |
| *H04L 29/08* | (2006.01) |

(52) U.S. Cl.
CPC ........... *H04L 51/24* (2013.01); *G06Q 30/016* (2013.01); *H04L 67/125* (2013.01); *H04L 67/34* (2013.01)

(58) Field of Classification Search
CPC ...... H04L 67/125; H04L 67/34; G06Q 30/016
USPC .................. 709/206, 224; 380/255; 358/1.13
See application file for complete search history.

(56) References Cited

U.S. PATENT DOCUMENTS

| | | | | |
|---|---|---|---|---|
| 6,697,469 | B1* | 2/2004 | Koster | H04M 15/07 379/114.29 |
| 2002/0022483 | A1* | 2/2002 | Thompson | H04L 12/1464 455/439 |
| 2004/0239973 | A1* | 12/2004 | Tanaka | H04N 1/00352 358/1.13 |
| 2005/0005163 | A1* | 1/2005 | Kirkpatrick | H04L 67/2819 726/4 |
| 2006/0262929 | A1* | 11/2006 | Vatanen | H04L 63/0823 380/255 |
| 2009/0059849 | A1* | 3/2009 | Namba | H04L 1/1825 370/328 |

(Continued)

*Primary Examiner* — Thuong Nguyen
(74) *Attorney, Agent, or Firm* — Haverstock & Owens LLP

(57) ABSTRACT

Context based multi-model communication in customer service is disclosed. In one innovative aspect, an architecture is provided. The architecture includes an application configured to perform a plurality of sets of functions addressable through a function identifier. Included is a wrapper around the application operable to receive notifications from a plurality of remote locations to address one or more sets of functions via the function identifier. The wrapper is arranged to send to a remote server an application identifier associated with the application and device information, upon first execution of the application by the processor. The device information includes at least a device identifier in the network it is operating with. The wrapper executes the application following receipt of a first notification including the application identifier and the device identifier and executes a function of the application following receipt of a second notification including the application identifier and the function identifier.

21 Claims, 9 Drawing Sheets

(56) References Cited

U.S. PATENT DOCUMENTS

| | | | |
|---|---|---|---|
| 2011/0264753 A1* | 10/2011 | Park | H04L 67/36 709/206 |
| 2012/0154389 A1* | 6/2012 | Bohan | G06F 9/5044 345/419 |
| 2012/0173765 A1* | 7/2012 | 't Hooft | G06F 1/1632 710/8 |
| 2013/0326502 A1* | 12/2013 | Brunsman | G06F 8/61 717/178 |
| 2014/0095692 A1* | 4/2014 | Anderson | H04L 67/22 709/224 |

* cited by examiner

CONTEXT BASED MULTI-MODEL COMMUNICATION IN CUSTOMER SERVICE

BACKGROUND

Field

The present application relates generally to customer service communications and more specifically to systems, methods, and devices for context based multi-model customer service communications.

Description of Related Technology

As devices become more robust, the content available for display via the devices also increases. The devices may process more data in a faster way to provide enhanced user experiences. For example, some smartphones are capable of downloading high-definition video content via a cellular/LTE/3G connection for display on the smartphone.

Improvements in various customer care service scenarios have been introduced as the functionality of a device is improved. For example, the medium of communication was enhanced from voice calls to instant messages with automatic help bots which further evolved into social communication channels. While they benefit customers to reach and engage with service providers in new modalities, each channel was relatively isolated and did not provide a level of privacy which inspired customer confidence in using any one of the service means. Accordingly, devices, systems, and methods for permitting secure toll-free application data network access on an application-by-application basis are desirable.

SUMMARY OF CERTAIN INNOVATIVE ASPECTS

In one innovative aspect, an electronic device comprising a processor to execute the software is provided. The electronic device includes an application configured to perform a plurality of sets of functions addressable through a function identifier. The architecture includes a wrapper around the application operable to receive notifications from a plurality of remote locations to address one or more sets of functions via the function identifier. The wrapper is arranged to, when executed by the processor, send to a remote server an application identifier associated with the application and device information, upon first execution of the application by the processor. The device information includes at least a device identifier in the network it is operating with. The wrapper is further arranged to execute a function of the application following receipt by the wrapper of a first notification or control message including a function identifier.

Thanks to the present system, a remote control of functions of an application is enabled. This is particularly useful for guiding a user when dealing with a customer care service scenario. A customer care professional may control remotely functions for instance of a customer care application on the user communication device so as to guide a user through different operation like the management of his/her user account.

In a further innovative aspect, a method of execution of an application on a device from a location remote to the device is provided. The method includes associating, via a storage device, each of a plurality of sets of functions of the application with a function identifier. The method further includes wrapping the application with a wrapper operable to receive notifications from a plurality of locations remote to the device to address one or more sets of functions via the function identifier. The method also includes transmitting, upon first execution of the application, to a remote server, an application identifier associated with the application and device information, the device information including at least a device identifier in the network it is operating with. The method further includes executing the application following receipt by the wrapper of a first notification including the application identifier and the device identified. The method includes executing one of the functions of the application following receipt of a second notification including the application identifier and the function identifier, wherein the application is executed on the device having a processor.

In yet another innovative aspect, a server for remotely controlling a software application running on an electronic device is provided. The application is characterized by a plurality of functions available on the electronic device through the application and a function identifier. The server includes a receiver configured to receive from the electronic device the application identifier and an electronic device identifier. The server includes a database configured to store the functions and corresponding function identifiers associated with the application identifier. The server also includes a processor configured to retrieve, from the database, the functions based on the received application identifier. The processor is further configured to provide a graphical user interface listing the functions, wherein the receiver is further configured to receive a selection of a function included in the listing. The processor is also configured to transmit, to the electronic device, a notification for remotely executing the selected function, the notification comprising the electronic device identifier, the application identifier and the function identifier.

In a further innovative aspect, a contextual service function routing device is provided. The device includes a service application registry configured to store service function information for a plurality of electronic client devices. The device further includes a service router configured to identify a service provider based on call information received from one of the electronic client devices. The service router is further configured to identify a wrapped application associated with the service provider, the wrapped application being identified by an application identifier and associated with a function. The service router is further configured to transmit a notification comprising the application identifier and a function identifier to the one of the electronic client devices.

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include context based multi-model customer service communications.

DETAILED DESCRIPTION OF CERTAIN ILLUSTRATIVE EMBODIMENTS

Figure 1:
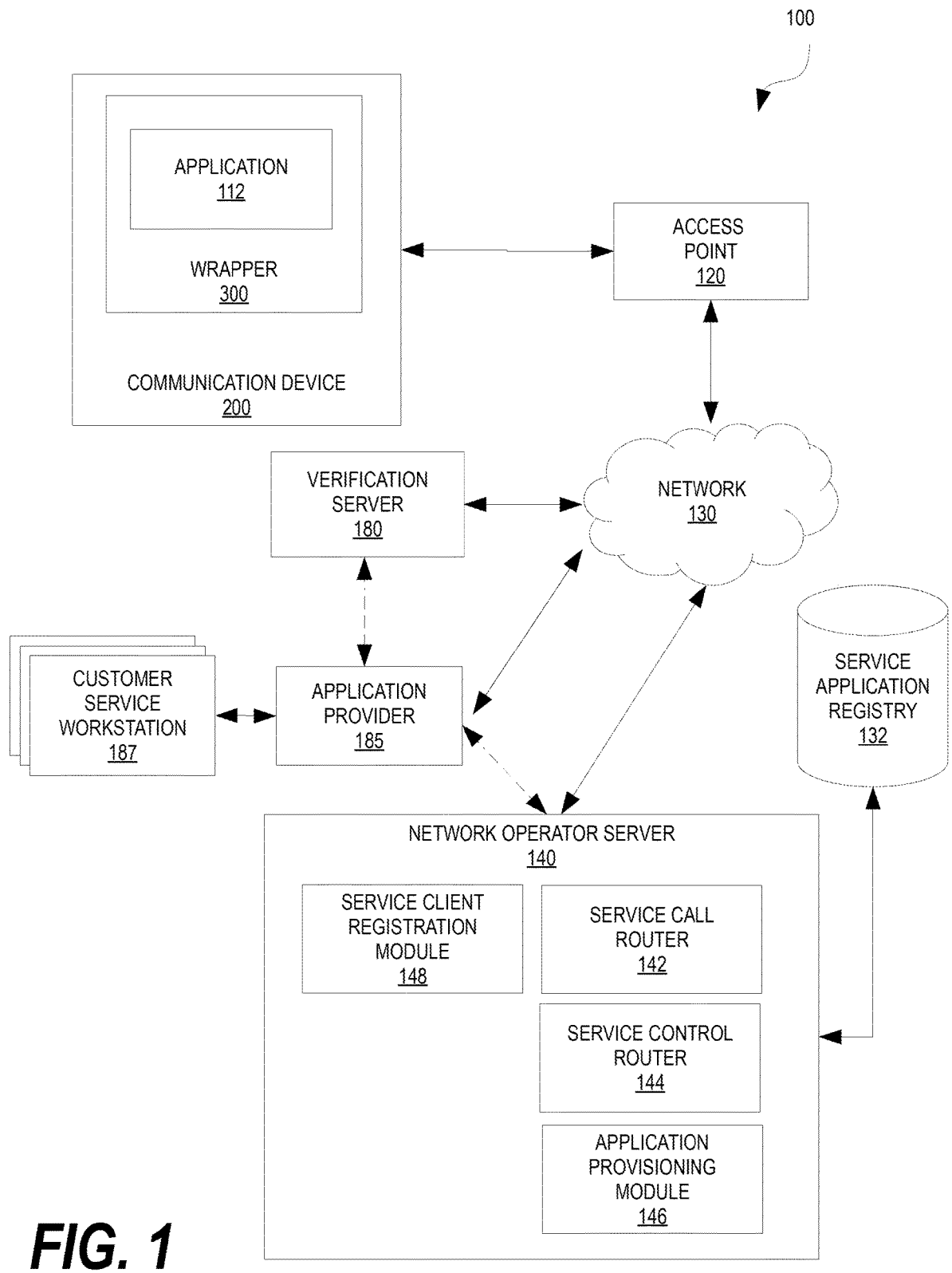
FIG. 1 is a functional block diagram of an example communication network system.

Some pain points with current service communications include the above mentioned privacy concerns. For example, customers often wonder whether they need to share sensitive personal or account information such as a social security number. Another pain point includes the ability to control and provide consistent service across communication channels. For example, channels like voice or instant message creates a wide open communication channels with varying degrees of user experience via each. Consider two customers explaining a problem with their home wireless router. One customer may take 13 minutes to explain via a voice call while a second may take 20 minutes to explain via a voice call. This discrepancy may be mitigated through the use of mixed communication models such as video, pictures, text, document sharing, and the like. However, an efficient and secure method of switching the channel of communications or maintaining parallel channels has not, prior to the present application, been available.

Many companies provide a self-service application on a variety of platforms. Such applications may be altered to allow access to subsets of functions available within the self-service application. The application may provide access to different functions, some accessible through graphical user interfaces (GUIs). The application may be associated to a wrapper that can access and trigger the different functions to pass on/send parameters such user info to a distant customer service. The different functions may be associated to different communication channels and may be active depending on the device capabilities. For instance an application may be able to obtain and transmit information through a chat or near field communication (NFC) channel. Depending on the device it is operating on, the different channels may be active or not.

The described features include registration. When an application is wrapped with customer service wrapper, and when the user launches an instance of the application, the wrapper is configured to register itself with user information and device capabilities such as a unique id, front camera, iris scanner, near field communication, and the like. One user may have multiple devices with different device capabilities. Accordingly, each device and application instance will be stored such as in central database. When a customer service agent wants to communicate with customer, the channel of communication (e.g., voice, instant message IM (vs) Video) and the method in each channel (e.g., use of 4 digit box for the user to enter the pin) can be based on context of the communication. (e.g., user verification context on IM configured to require customer agent to send a unique control which accepts only 4 digits from user, and this info is not visible to agent.

The described features also include remote invocation of graphical user interface (GUI) elements. For example, when a channel of communication is chosen, the agent can also send a request to launch unique GUI elements to the customer. Each GUI element may be associated with unique properties (e.g., visible to agent or not, 60 character max). The properties may be defined by the service provider such that an element for a first business may be configured to perform a first set of functions and the same element be dynamically reconfigured to perform a second functions. When launched they perform the functions according to the properties and configuration.

The described features also allow the switching of communication channels and/or maintaining parallel communication channels. At any point of time, the agent or the customer can request to change or start an additional channel of communication. The identification of a new channel may be based on the device, the device capabilities, and the context of the communication.

One example implementation of these features is a banking scenario. When the user first triggers the application, for instance a banking application, the wrapper will gather a number of characteristics from the device and register itself to the banking server, with for instance user information, application name and device capabilities (e.g. unique id, front camera, iris scanner, NFC, etc.).

A user may call the bank to inquire about her account status. A server of the bank may identify the device and present to the bank's service agent an interface with the different functions and characteristics available through the baking application on the specific registered device(s). Based on the ongoing dialogue with the customer, he may request the customer to enter his social security number and to that extend, pushes on the interface facing him the social security provision function.

The system recognizes the requested function and recipient for triggering such a function, passes on the corresponding parameters to the network so that they can be pushed (e.g., through notification push) to the registered device of the user. There the wrapper receives the instructions, and pass them on to the banking application on the user device to trigger the requested function and present the identified GUI to the user.

In order to enable such a remote control, the GUI presented to the agent is related to the banking application's functions. To make this possible, a mapping exists at the banking server level so that, based on the characteristics received from the registration of the application, the right palette of GUI options may be presented to the agent. Furthermore the application identifier identifies at the banking server not only the application, but also its version, its operating system and different characteristics linked to that version. This will allow retrieval at the banking server the functions that are available through the banking application instance on the user device.

The innovative features described include a mechanism whereby the customer service aspects are added as wrapped layer to existing application or new application. This wrapper can be customized based on each enterprise need (e.g., customer service operation).

Accordingly, the agent may remotely launch the application on the user's device to initiate an instant message session. The agent may also access various GUI elements in IM to conduct the service session. The systems, methods, and devices described in further detail below are configured to switch between voice, IM, and other communication channels or continue both channels of communication to resolve the customer issues.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example communication network system. The system 100 includes a communication device 200. The communication device 200 may be an electronic communication device such as a mobile phone, a smart phone, a tablet computer, a personal computer, a game console, a set-top box, or other communication device configured to transmit/receive data.

The communication device 200 may include an application 112. An application may generally refer to an installed capability for the communication device 200. Example applications include a web browser, a movie viewer, a music player, a newsreader, a document editor, an identity/credential manager, a customer service client, or other functional additions to the communication device 200. The application 112 may be installed on the communication device 200 by the manufacturer, a network operator providing service for the device, and/or a user of the communication device 200. The application 112 may be installed once hardware is attached to the communication device 200. For example, attaching a sensor to the communication device 200 may cause the execution/installation of the application 112. The installation may be performed at the time of manufacture, via over the air provisioning, via storage coupled to the communication device 200 such as a SIM card, or other suitable installation means.

The application 112 may be wrapped by a wrapper 300. The wrapper 300 may be considered a container for the application 112. The application 112 may be executable without a wrapper, but the wrapper 300 may provide additional functionality for the application 112 without requiring the application developer to know the details of the wrapper 300 interface. For example, in the context of customer service, an application developer may provide a customer service client application to allow customers to view documents, ask questions, update account information, place or adjust orders, provide feedback (e.g., quality control), and the like. It may be desirable to allow customer service representative to access these functions during a service session. This affords more options to a service provider to enhance the service experience. The features and methods related to such "enhanced" (e.g., context based multi-model communication) customer service are described in further details below.

The communication device 200 may be configured to access a network 130 via an access point 120. The access point 120 may be a Wi-Fi access point, a cellular access point, an LTE or other 3G access point, a radio access point, a wired access point (e.g., Ethernet), or other network portal. Accordingly, the network 130 may be a packet switched network, a public network, a wide-area network, a private area network, a mesh network, a cellular network, a radio network, a local area network, or other such communication network configured to transmit and receive data between devices.

The access point 120 may be configured to permit certain communication devices access to the network 130. The access point 120 may perform authorization for the communication device before allowing access to the network 130. The communication device 200 may provide information to the access point 120 which may be used to determine whether or not to allow the communication device 200 to access the network 130. The access point 120 is generally associated with a service provider. The service provider is the entity which determines who may access the network 130. For example, a telecommunications company may construct a radio tower access point to allow customers with a valid subscription to access a network. In such cases, the telecommunications company may wish to limit or otherwise control who can access the network.

The system 100 includes a network operator server 140. The network operator server 140 may be configured and controlled by a service provider. The network operator server 140 may include one or more entities to facilitate the enhanced customer service features described.

A service call router 142 may be associated with the network operator server 140. The service call router 142 is configured to intercept calls from the communication device 200 and determine a route for the call. A call may be a traditional voice call, a voice over IP call, a video conference call, an instant message (e.g., text or multimedia) call, or other transmission to or from the communication device 200. The call may be initiated by the application 112.

Information included in the call may be used by the service call router 142 to determine the call route. For example, the call may be dialed to a customer service hotline associated with a company. The service call router 142 may include a registry of phone numbers and associated companies. When a call is received which includes a phone number for an associated company, the service call router 142 may apply a routing rule to deliver the call to the company. For example, the routing rule may be specified to transmit calls to a first call center during a first time period of a day and to a second call center during a second time period of a day. This routing is transparent to the caller and allows greater flexibility in providing customer service.

In some instances, the company providing the customer service may also offer a customer service application. The system 100 shown includes an application provider 185. The application provider 185 is an entity that provides the application which will be wrapped. The application provider 185 may be coupled with the network 130. The application may be provided via the network 130 such as through an Internet download or an application store. In some implementations, the application provider 185 may provide the application to the network operator server 140 for wrapping and/or distribution. The application provider 185 may also establish call routes and service routes for the application via the network 130. FIG. 1 shows an optional communication path directly from the application provider 185 to the network operator server 140. Such a direct communication path may be used to provide the application to the network operator for wrapping and/or establish the service related policies. The service related policies may include call routing information, service application functions available for remote triggering, service control routing information (e.g., how to route data to or from the wrapped application).

The application provider 185 may be associated with one or more customer service workstations 187. The customer service workstation 187 is configured to conduct customer service sessions for a customer. The customer service workstation 187 may include a telephone or other audio input/output device to allow real-time voice communication with a caller. The customer service workstation 187 may include a video element to provide video conferencing with a customer. The customer service workstation 187 may be further configured to access one or more applications such as a purchasing system, a scheduling system, a customer information system, an account information system, and the like to provide the requested customer service activities.

Prior to accessing the application 112 by the customer service workstation 187, the application 112 must be installed on the communication device 200. To facilitate making the application 112 available, the network operator server 140 may include an application provisioning module 146. The application provisioning module 146 is configured to obtain configuration information for wrapped applications such as the sets of functionality available for an enhanced customer service session. The application provisioning module 146 may also receive the unwrapped application from the application provider and apply the wrapper. Once provisioned, the wrapped application may be published or otherwise made available to devices via, for example, the application provisioning module 146.

Once installed on the communication device 200, the wrapper 300 may be configured to communicate with the network operator server 140 to register. A service client registration module 148 may be included in the network operator server 140 to manage the registration information. The registration process collects information about the communication device 200 and a user thereof to the network operator server 140. The information provided during registration may include one or more of: a unique identifier for the communication device 200 (e.g., mobile equipment identifier (MEID), international mobile station equipment identity (IMEI), or electronic signature number (ESN)), a unique identifier for the wrapped application, a username, a password, address information (e.g., street address, email address, network address), access credentials (e.g., token, digital signature, public key information), an account number, an account password, network service provider, and the like. This information may be stored in a service application registry 132. As shown in FIG. 1, the service application registry 132 is coupled with the network operator server 140. In some implementations, the service application registry 132 may be coupled with the application provider 185.

While establishing or during a customer service session, the devices having the application 112 installed may be presented on the customer service workstation 187. The devices may be identified based on information included in a session communication such as a telephone number, or received during the session such as an account number, a username, or an address. If a customer service representative identifies a need for one or more of the functions of the wrapped application, a device and function may be selected from the list of registered devices presented on the customer service workstation 187.

To controlled (e.g., remotely invoked) a function of the application 112 from the customer service workstation 187, a control message may transmitted from the customer service workstation 187 to the communication device 200 via the network operator server 140. The control message may include an identifier of the set of functions to be executed. In some implementations, the control message may also include parameters to one or more of the set of functions. Example parameters include one or more of: binary files (e.g., image, audio, video, documents), text data, and service session details (e.g., service representative name, service representative identifier, service session identifier, customer service workstation identifier).

The control message may be transmitted via the network operator server 140. In such implementations, a service control router 144 may be included. The service control router 144 is configured to route service control messages transmitted to or received from the communication device 200. For example, the service control router 144 may identify a control message to begin a video chat session. The service control router 144 may proactively set up a network pathway suitable for video chat. This may include establishing a new connection between the communication device 200 and the customer service workstation 187. This may include adjusting the quality of service parameters for an existing connection. This may include adjusting the billing for the video chat. For example, it may be desirable to allow the application provider 185 to absorb the data cost for a video service call rather than deducting the data transmission from the subscription associated with the communication device 200.

When receiving messages from a wrapped function, the service control router 144 may be configured to pass the information received to the customer service workstation 187. In some implementations, the information may be sensitive. Examples of sensitive information include social security numbers, credit card numbers, personal identification numbers, or signatures. As such, it may be desirable to provide the information to a trusted third-party for verification or further processing. A verification server 180 may receive the information from the wrapped function and provide a verification result which can be safely provided to the customer service workstation 187. The verification server 180 may provide the result via an optional communication path to the application provider 185. In some implementations, the verification server 180 may transmit the result through the network 130 to the application provider 185. The service control router 144 may, in some implementations, be included in the application provider 185. In such implementations, the application provider 185 is configured to intercept and control the service control message handling as described above and in further detail below.

Figure 2:
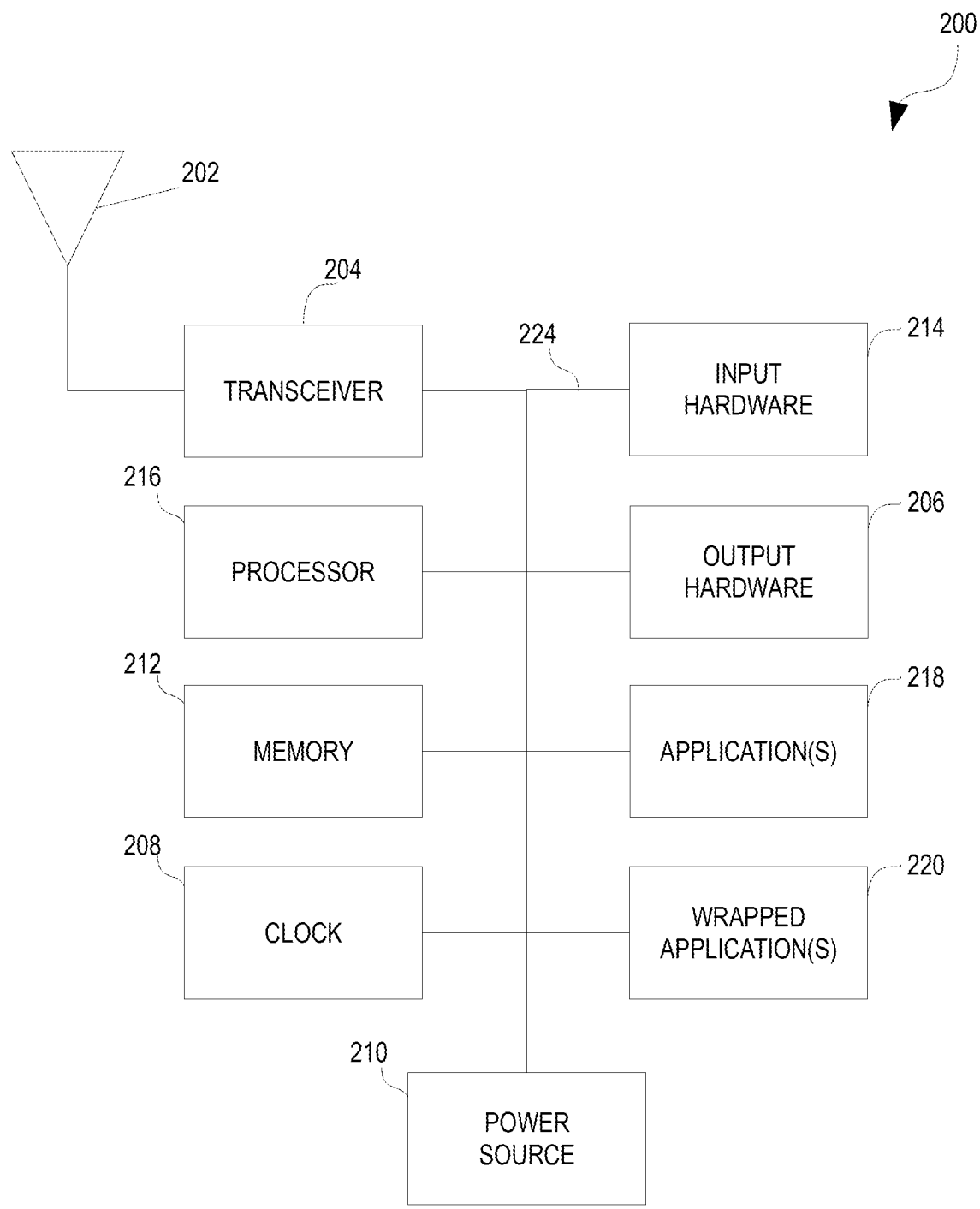
FIG. 2 is a functional block diagram of an example of a communication device.

FIG. 2 is a functional block diagram of an example of a communication device. When implemented as a device hosting a wrapped application, the communication device 200 may include circuitry for performing the main functions of a mobile phone, such as a mobile smart-phone, a tablet computer, a laptop computer, gaming console, set-top-box, personal computer, wearable computing device, or the like.

The communication device 200 may include one or more antennas 202 and a transceiver unit 204 for the transmission and reception of wireless signals; output hardware 206 such as an audio unit, a microphone, and/or a display screen; a clock 208; a power source 210 (e.g., battery, solar panel, wired power connection); a memory 212, input hardware 214 such as a keypad or touchscreen for receiving a user input, a GPS unit for indicating the geographical location of the device, a wired network connection (e.g., Ethernet port); and a processor 216. Some output hardware 212 such as a display screen may include a touch sensitive screen. Accordingly, some output hardware 212 may provide input functionality and some input hardware 214 may provide output functionality. The memory 212 may include one or more memory circuits including non-volatile memory circuits (e.g., EEPROM, FLASH, etc.).

Depending on the capabilities of the communication device 200 and the supporting telecommunication networks the communication device 200 can also provide a range of voice and data communication services. As non-limiting examples the communication device 200 provides telephone network based communication services including voice, multimedia and text messaging, as well as other data exchange capabilities, enabling Internet access and email exchange, for example.

The communication device 200 may be configured to exchange data via a 3G network with remote servers such as a wholesale operator server and/or an application provider, and to enable data exchange enabling Internet access (e.g., data network). The communication device 200 is operable to have applications or widgets installed, such as, but not limited to social networking applications or email applications, for example, which when executed may exchange data with the remote servers. Each application or widget installed on the communication device 200 may have an associated graphical user interface.

The communication device 200 may also include one or more applications 218. The communication device 200 may further include one or more wrapped applications 220. A wrapped application 220 is distinguishable from an application in that communications to/from the wrapped application 220 are exchanged via an application wrapper.

Figure 3:
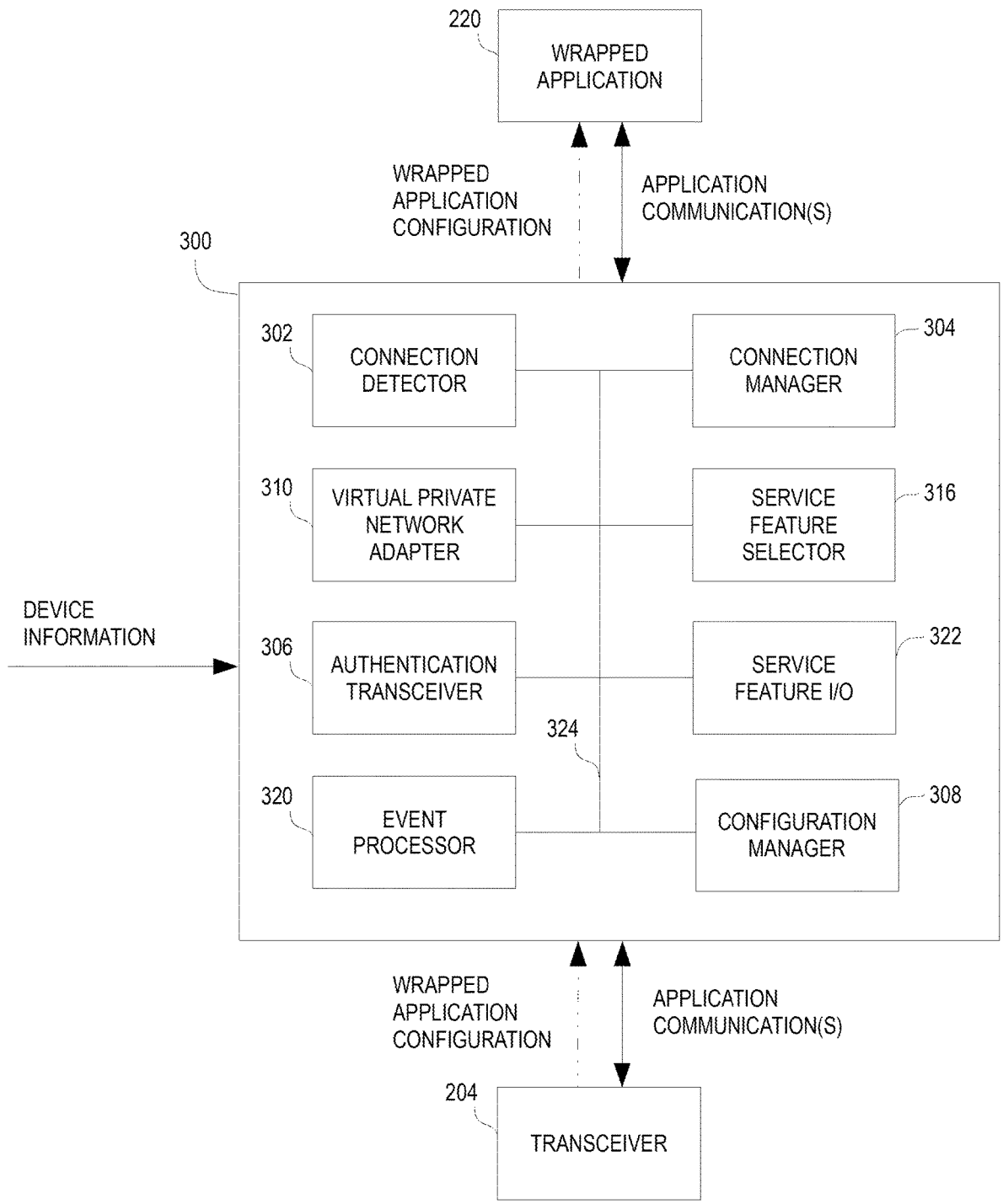
FIG. 3 is a functional block diagram of an example of an application wrapper.

FIG. 3 is a functional block diagram of an example of an application wrapper. The application wrapper 300 includes a connection detector 302. The connection detector is configured to detect connection activity for the wrapped application 220. Connection activity may include a request for a connection, a request to transmit information via a connection, termination of a connection, reset of a connection, execution of a function, transmission of data from a function, or other data communication connection activities.

The connection detector 302 may be configured to detect connection activity based on the application communications received from the wrapped application 220. The connection detector 302 may be configured to generate a message identifying the connection activity and transmit this information via a bus 324.

A connection manager 304 may obtain the message identifying the connection activity. If the message identifies a request for a new connection, the connection manager 304 may cause the initiation of the connection. Once a connection is established, the connection manager 304 may be configured to maintain the connection on behalf of the wrapped application 220. One example of a connection may be a video chat connection for a customer service session.

The connection manager 304 may transmit an authentication request via an authentication transceiver 306. The authentication request may identify a user accessing a function or the function being accessed. The authentication request may be transmitted to a network operator server. The authentication request may include an identifier for the application or an operator associated with the application.

The authentication transceiver 306 may receive the authentication response. The authentication response may include service control routing information. The authentication response may include an authentication token for a "toll-free" data connection. The token may be used for subsequent communications to or from the application to indicate the authorization status for the connection. The authentication response may also include a data connectivity policy including one or more of a data transmission amount, a receive data amount, a data connection duration, and a policy expiration time.

A configuration manager 308 may be included in the wrapper 300. The configuration manager 308 may include one or more parameters for the wrapper 300 and/or the wrapped application 220. For example, the configuration manager 308 may receive wrapped application configuration information via the transceiver 204. The wrapped application configuration information may identify a network address for the network operator server, information to be included in the authorization request, information regarding the data connectivity policy, applying copy protections for the application or associated data stored for the application, enabling/disabling device features during application execution (e.g., screen shot, camera, microphone), whether the application has been registered, required registration information, provided registration information, or other parameter(s) to identify and adjust the functions of the wrapper 300 and/or the wrapped application 220.

One non-limiting advantage of the configuration manager 308 is the ability to remotely adjust the wrapper 300 and/or the wrapped application 220. Such control may be useful for providing bug fixes, disabling rogue devices/applications, or dynamically adjusting operational aspects of the wrapped application 220 without requiring a reinstallation or affirmative action on behalf of a user of the device.

The wrapper 300 may also include a virtual private network adapter 310. The virtual private network adapter 310 may be included to provide secure communication between the wrapped application 220 and the network 130. Upon establishing a connection, the virtual private network adapter 310 may be used for application communications. The virtual private network adapter 310 may be used only for authentication. In some implementations, it may be desirable to use the virtual private network adapter 310 for application data communications as well. For example, if the application is a banking application, the application developer may determine that certain transactions utilize the virtual private network adapter 310.

A service feature selector 316 may be configured to provide information regarding the sets of functions if the wrapped application 220 available for remote execution. The service feature selector 316 may be configured to obtain an identifier for a set of functions for execution. The information provided by or obtained by the service feature selector 316 may be communicated via a service feature input/output 322. The service feature input output 322 may be configured for multiple communication models such as cellular, WiFi, Bluetooth, and other standardized communication protocols. The service feature input/output 322 provides a point of contact for the wrapper 300 to send and receive control messages.

Once executed, the service function may provide output messages. These messages may be received by an event processor 320. The event processor 320 may be configured to receive a service control message and instruct the wrapper 300 and/or the wrapped application 220 to take one or more actions based on the received message. In addition to handling service control events, the event processor 320 may be configured to identify device events such as powering down, low battery, incoming phone call, termination of a phone call, initialization of an application, termination of an application, device locking, device unlocking, and the like. In some implementations, the event processor 320 may be configured to transmit event information to a third-party. For example, a wrapped application to keep track of access to a banking customer service application installed on a smartphone is located may detect movement into an area of interest (e.g., into a 'restricted' area, at a specific time, etc.). This event may cause the transmission of a text message or email message to another device (e.g., a account co-owner's smartphone) in addition to transmitting application data to the application provider.

The wrapper 300 shown in FIG. 3 receives device information. The device information may include one of power or network bandwidth available to the device, a location identifier indicating a geospatial location of the device, a device identifier uniquely identifying the device, and a user identifier. Examples of device information include a device operating system identifier, an operating system version, and device events and/or errors. The device information is made available to the elements of the wrapper 300 for further processing. For example, the service feature selector 316 may be configured to disable functions (e.g., camera functions) when device resources are limited (e.g., low bandwidth, low power).

The bus 324 may couple the above described elements for the wrapper 300. The bus 324 may be a data bus, communication bus, or other bus mechanism to enable the various components of the wrapper 300 to exchange information. It will further be appreciated that while different elements have been shown, multiple elements may be combined into a single element, such as the service feature selector 316 and the event processor 320.

Figure 4:
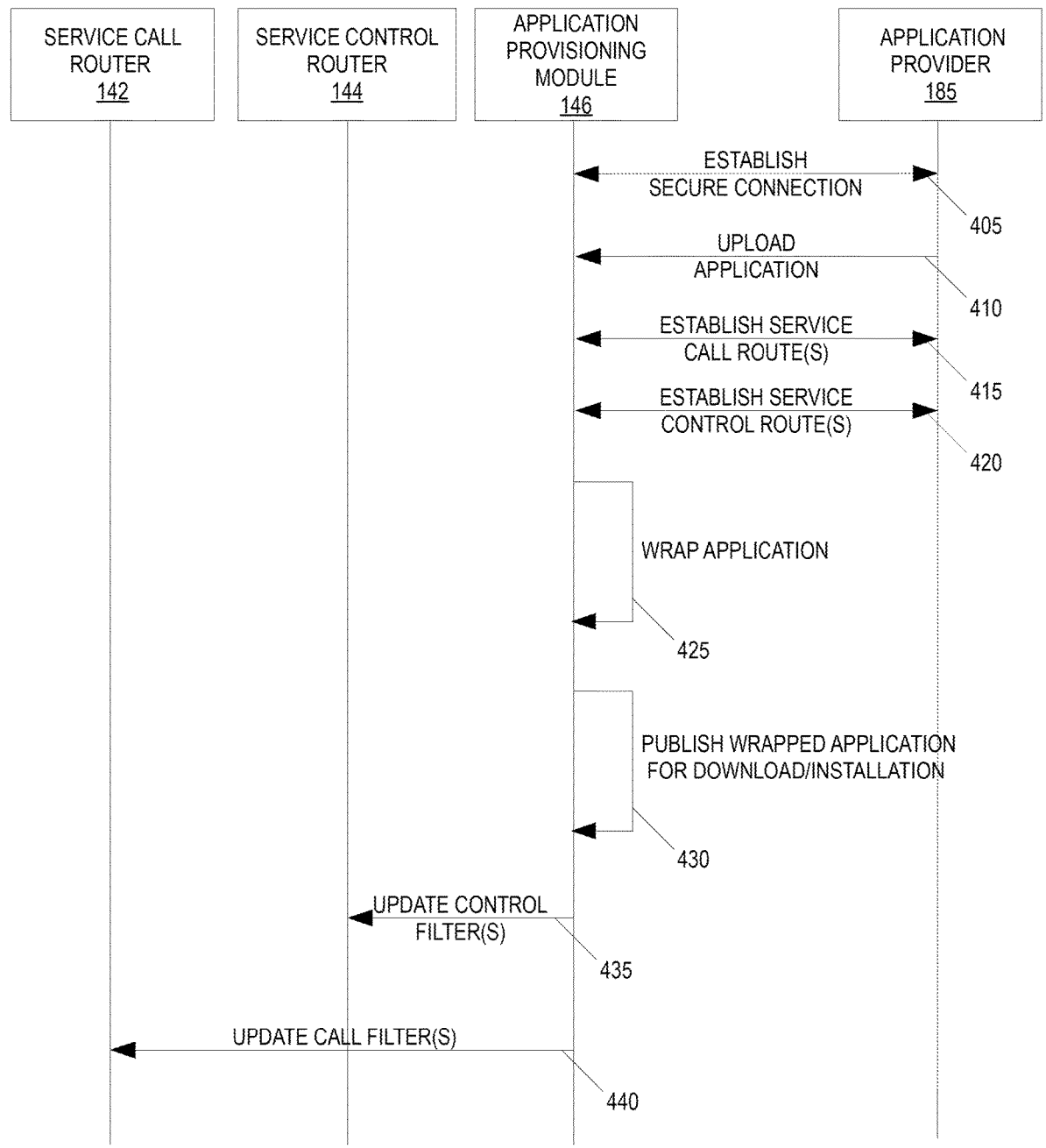
FIG. 4 is a message diagram for provisioning an enhanced customer service wrapped application.

FIG. 4 is a message diagram for provisioning an enhanced customer service wrapped application. The message flow of FIG. 4 shows messages exchanged between several entities which may be included in a communication system. For ease of explanation, the number of entities shown has been limited. However, it will be understood that additional entities may be added or multiple entities combined consistent with the description herein.

Messaging 405 is performed between the application provider 185 and the application provisioning module 146 to establish a secure connection. Establishing a secure connection may be desirable to prevent tampering with the application that will be provided for wrapping. For example, tampering may include a man-in-the-middle attack. In some implementations, the messaging 405 may include providing physical media including the application such as a DVD-ROM or disk drive which do not need network connectivity.

Messaging 410 is performed to upload the application to the application provisioning module 146. The application provisioning module 146 may perform initial processing on the received application such as virus scanning, application size verification, formatting, decryption, hash checking, and the like. The received application may be stored in a memory associated with the application provisioning module 146.

Messaging 415 is performed to establish one or more service call routes for the wrapped application. A service call route may include incoming call identification information and associated destination information. As described above, the routes may also be associated with selection criteria such as caller's location, time of day, day of week, or other information that the service call router 144 may use to direct service calls.

Similar messaging 420 is performed to establish one or more service control routes for the wrapped application. The service control routes may identify how service control messages for particular functions are routed. For example, functions related to personal identification number (PIN) entry may be associated with a secure communication path. In some implementations, this route may also include a third-party verification server, such as the verification server 180 shown in FIG. 1.

The application provisioning module 146 wraps the uploaded application via message 425. In some implementations, wrapping the application may include adding the call or control routes for the application into the wrapped application.

Once wrapped, via message 430, the wrapped application is published for download and/or installation. In some implementations, the publication may be to a location of the application provisioning module 146. In some implementations, the publication may be to a network location other than the application provisioning module 146 such as an FTP site, an application store, a webserver, or the like.

As the process shown in FIG. 4 may be specifying new routes for existing applications, the updates may be propagated to the service call routers and service control routers. Message 435 is transmitted from the application provisioning module 146 to the service control router 144 for routing control messages which may be related to the application installed on communication devices. Message 440 is transmitted to the service call router 142 to provide the call routing information for routing calls which may be related to the application installed on communication devices. The routers may establish filters to monitor the traffic for the identified application according to the received routing messages 435 and 440.

Figure 5:
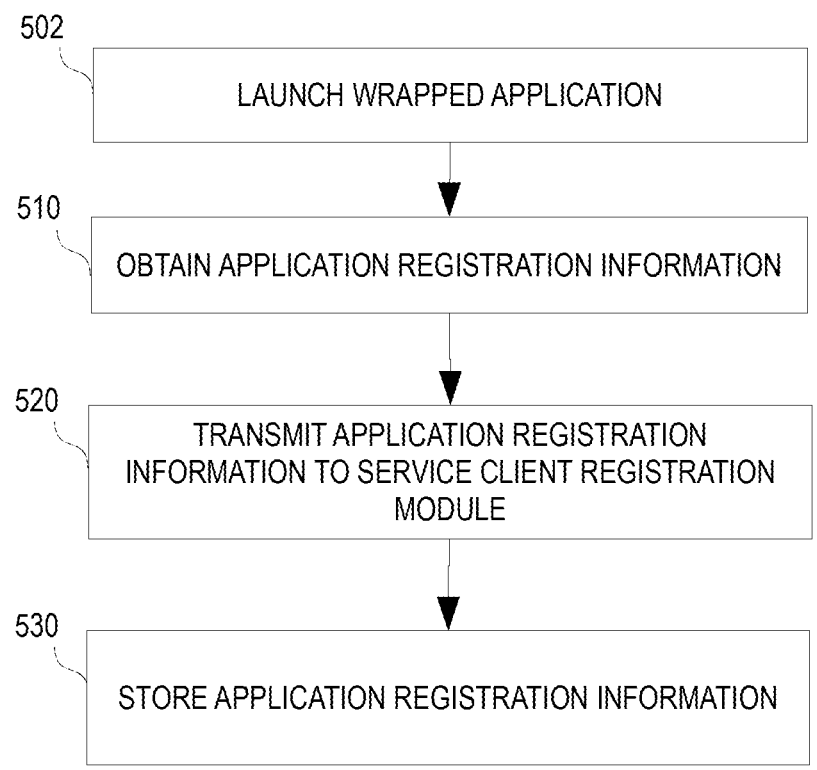
FIG. 5 is a process flow diagram of an example method of registering an enhanced customer service wrapped application.

FIG. 5 is a process flow diagram of an example method of registering an enhanced customer service wrapped application. The method shown in FIG. 5 may be implemented in a client communication device such as the communication device 200 shown and described in, for example, FIGS. 1 and 2. The method assumes the wrapped application has been installed on the device, but has not yet been executed.

At block 502, the wrapped application is launched. Launching the application may include receiving an indicator associated with the application and loading one or more instructions for execution by a processor of the device. Upon launching, the instructions may include a check for whether the application has been registered. The check may include querying a known location in the memory for a value which, when set to a first value, identifies the wrapped application as being registered and, when set to a second value, identifies the wrapped application as needing registration. As the process shown in FIG. 5 illustrates the registration process, the process assumes that the application requires registration.

At block 510, the application registration information is obtained. Obtaining the application registration information may include automatically collecting information. For example, the application may have access to device characteristics which may be required for registration. Examples of these characteristics include device identifier, device power source, device power level, device connectivity mode, device connectivity quality, and the like. Obtaining the application registration information may include receiving user inputs, such as via an interactive interface. Other information provided during registration may include one or more of: a unique identifier for the communication device 200 (e.g., mobile equipment identifier (MEID), international mobile station equipment identity (IMEI), or electronic signature number (ESN)), a unique identifier for the wrapped application, a username, a password, address information (e.g., street address, email address, network address), access credentials (e.g., token, digital signature, public key information), an account number, an account password, network service provider, and the like.

At block 520, the application registration information is transmitted from the communication device to the service client registration module 148. The transmission may be wired or wireless transmission via the network 115. In some implementations, it may be desirable to transmit the registration information to the application provider 185. At block 530, the application registration information is stored such as in the service application registry 132.

Figure 6:
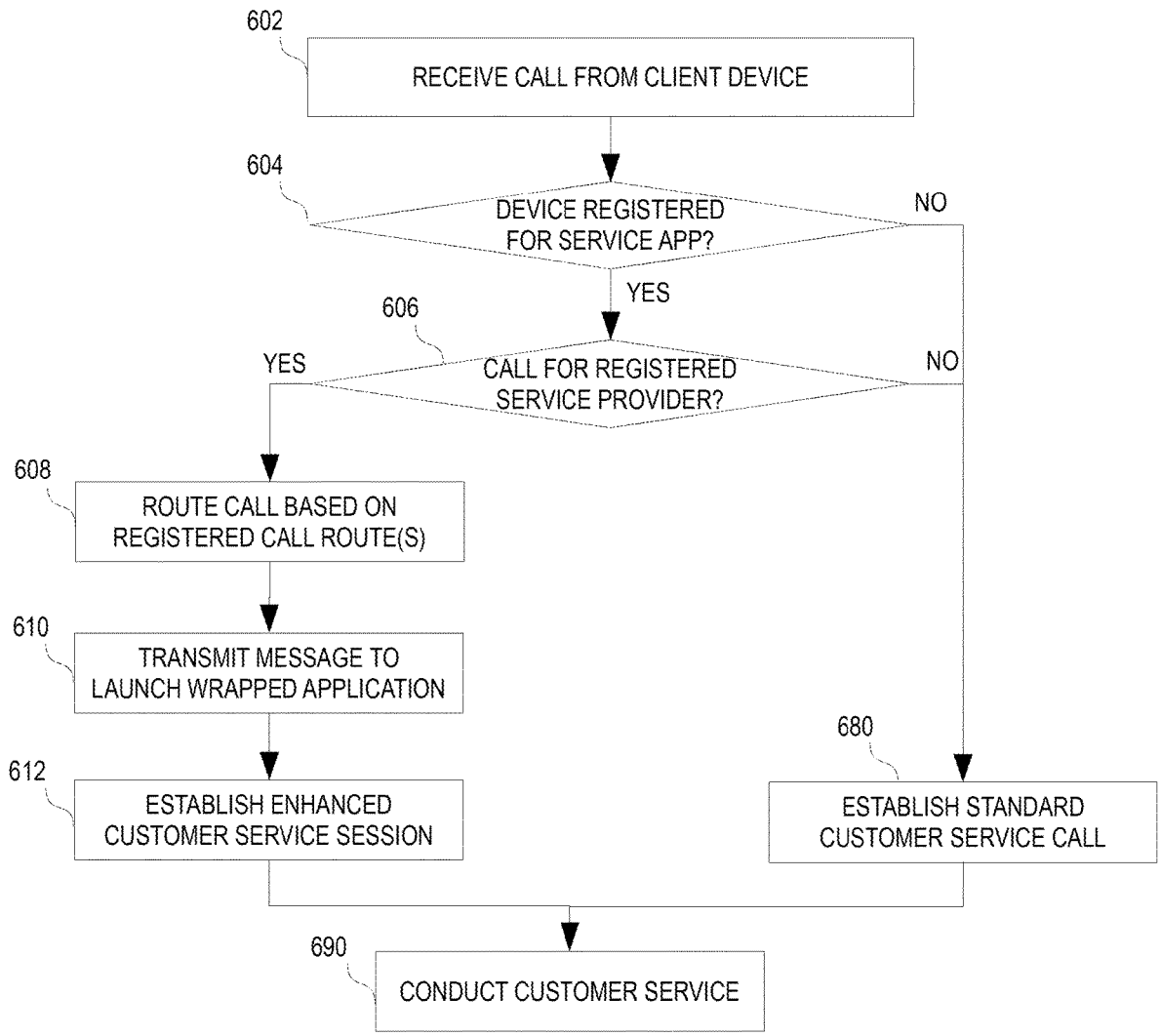
FIG. 6 is a process flow diagram of an example method of service call routing with a wrapped service application.

FIG. 6 is a process flow diagram of an example method of service call routing with a wrapped service application. The method shown in FIG. 6 may be implemented in a network communication device such as the network operator server 140 shown and described in, for example, FIG. 1.

At block 602, a call is received from a client device. The call may be a voice call from a telephone to a destination phone number such as a customer service toll-free number. The call may include identifying information for the calling device such as a phone number, address, mobile equipment identifier (MEID), international mobile station equipment identity (IMEI), or electronic signature number (ESN).

At decision block 604, a determination is made based on the information included in the call, whether the device identified by the information in the call is registered for a wrapped service application. The determination may include querying the service application registry 132 for registered devices. If the device is not identified or not associated with a wrapped service application, the process continues to block 680 where a standard customer service call is established. A standard customer service call generally refers to a point-to-point call via a communication channel between a caller and a service provider. At block 690, customer service is conducted. Conducting customer service may include, for example, changing a customer's account information, placing an order, or filing a request or complaint for service. It will be appreciated that conducting customer service via a standard customer service call is limited in the types of information that can be exchanged between participants and the manner in which the information may be exchanged. As described herein, an enhanced customer service session affords multi-model communications.

Returning to decision block 604, if it is determined that the device associated with the call is registered, a further determination is made at block 606 as to whether the call is associated with a registered service provider. As with the determination made at block 604, the determination at block 606 is based on the information included in the call. For example, the service application registry 132 may include destination phone numbers for customer service providers configured to support enhanced customer service sessions. If it is determined at block 606 that the call is not associated with an enhanced customer service provider, the process continues to establish a standard customer service call at block 680 as described above. Returning to decision block 606, if the call is determined to be associated with a registered service provider, at block 608, the call is routed based on registered call routes. The call routes may be provided when an application provider provisions the enhanced customer service wrapped application as described in FIG. 4 above. The call may ultimately be routed to a customer service workstation to conduct a customer service session. The routing may be performed by the service call router 142.

In addition to routing the call, at block 610, a message may be transmitted to launch the wrapped service application. In some implementations, the message is transmitted to the device which placed the call received at block 602. In some implementations, the message is transmitted to another registered device. The message is transmitted based on the information included in the service application registry 132. The message to launch the application may include a push notification or another message causing the device to execute the wrapped service application. In some implementations, the message may include a service session identifier which can be used to associate the call portion of the service session with data from the wrapped application.

At block 612, an enhanced customer service session is established. The establishing of the enhanced customer service session may include successful routing of the call to a service workstation and execution of the wrapped application on a caller's device. At block 690, customer service is conducted as described above but with the added benefit of multiple model communications. As described herein, the customer service agent may now invoke one or more functions of the wrapped application during the enhanced customer service session.

Figure 7:
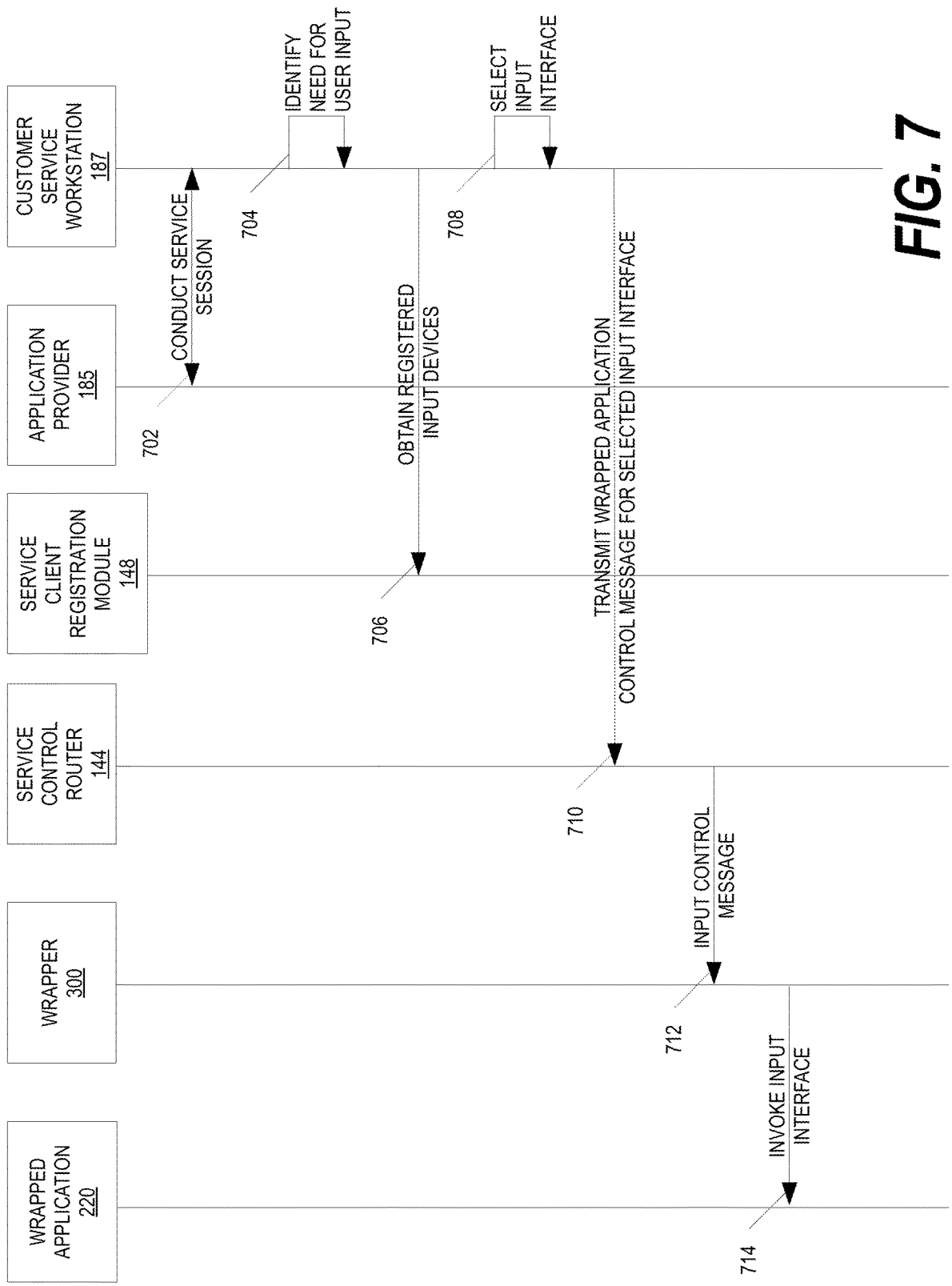
FIG. 7 is a message diagram for invoking a function of an enhanced customer service wrapped application.

FIG. 7 is a message diagram for invoking a function of an enhanced customer service wrapped application. The message flow of FIG. 7 shows messages exchanged between several entities which may be included in a communication system. For ease of explanation, the number of entities shown has been limited. However, it will be understood that additional entities may be added or multiple entities combined consistent with the description herein.

The customer service workstation 187 is located at a location remote to the wrapped application 220. The customer service workstation 187, via messaging 702, conducts the enhanced customer service session. As shown in FIG. 7, the messaging 702 is between the customer service workstation 187 and the application provider 185. This messaging may include updating customer information, placing an order, providing customer feedback, and the like.

During the customer service session, at messaging 704, the need for user (e.g., customer/caller) input may be identified. The need may be identified based on the service activity being performed. For example, a workflow established for the customer service workstation 187 may include a step of obtaining a confirmation of the caller's identity. The need to identify the caller's identity may be identified by messaging 704.

Message 706 may be transmitted to the service client registration module 145 to obtain registered input devices for the current caller. The caller may not be calling from a device which is capable of obtaining and/or providing the identified user input. Accordingly, the registered devices available for triggering are identified. Similarly, a characteristic of the device may preclude it from otherwise presenting the interface. For example, the network to which the client device is attached (e.g., Wi-Fi/3G/4G/LTE) may be considered during selection of devices and controls available for triggering. The device capability may also be considered during selection of devices and controls. For example, a device may not include a camera, as such, interface elements which include camera inputs would be excluded from the list of interface controls available for the service session. Thus the list may be filtered to reflect the current client device characteristics and capabilities.

The list of registered devices may be presented via the customer service workstation 187. The customer service workstation 187 may receive an input identifying which device input interface to trigger via message 708. The input may include a selection of an electronic device and interface to trigger.

Via message 710, a wrapped application control message for the selected input interface is transmitted from the customer workstation 187 to the wrapper 300. The message may comprise the selected device identifier and be transmitted via the network service operator server 140 the customer service workstation 187 is communicating with. The control message may, in some implementations, include routing to the verification server 180. For example, there may be sensitive information included in the control message to initialize the selected input. The verification server 180 may identify this sensitive information and provide an anonymous version of the value. For example, the verification server 180 may use regular expressions to identify text representing an account number or social security number. The verification server 180 may provide an anonymized version of the sensitive information in place of the full sensitive value.

As shown in FIG. 7, the control message provided by the service control router 144 to the wrapper 300 via message 712. In some implementations, the service control router 144 may route the control message to one or more verification servers. In such implementations, a verification server may be configured to provide the verified control message to the wrapper 300.

The wrapper 300 may receive the message 712 via the service feature I/O 322 and identify the input control to trigger based on the received message. In some implementations, the control message may include an interface identifier and input data. The interface identifier indicates which function or set of functions to trigger. The input data includes the information to be provided to the function or set of functions upon triggering. Once the input interface is identified, the wrapper 300 invokes the input interface of the wrapped application 220 via message 714.

Examples of input interfaces include: service agent rating interface, PIN entry interface, biometric entry interface, bi-directional document viewing interface, signature entry interface, survey entry interface, photograph presentation and selection interface, voice chatting, video conferencing, telephone call placing interface, text messaging interface, file upload/download interface, password entry interface, white board interface (e.g., interface configured to allow interactive writing or drawing between the client and agent), gesture interfaces, and the like.

Having provisioned the wrapped application (see, e.g., FIG. 4), registered one or more client devices having the wrapped application (see, e.g., FIG. 5), established an enhanced customer service session (see, e.g., FIG. 6), and invoked an interface or other function of the wrapped application from a remotely located customer service workstation (see, e.g., FIG. 7), the wrapped application may transmit information from the invoked interface.

Figure 8:
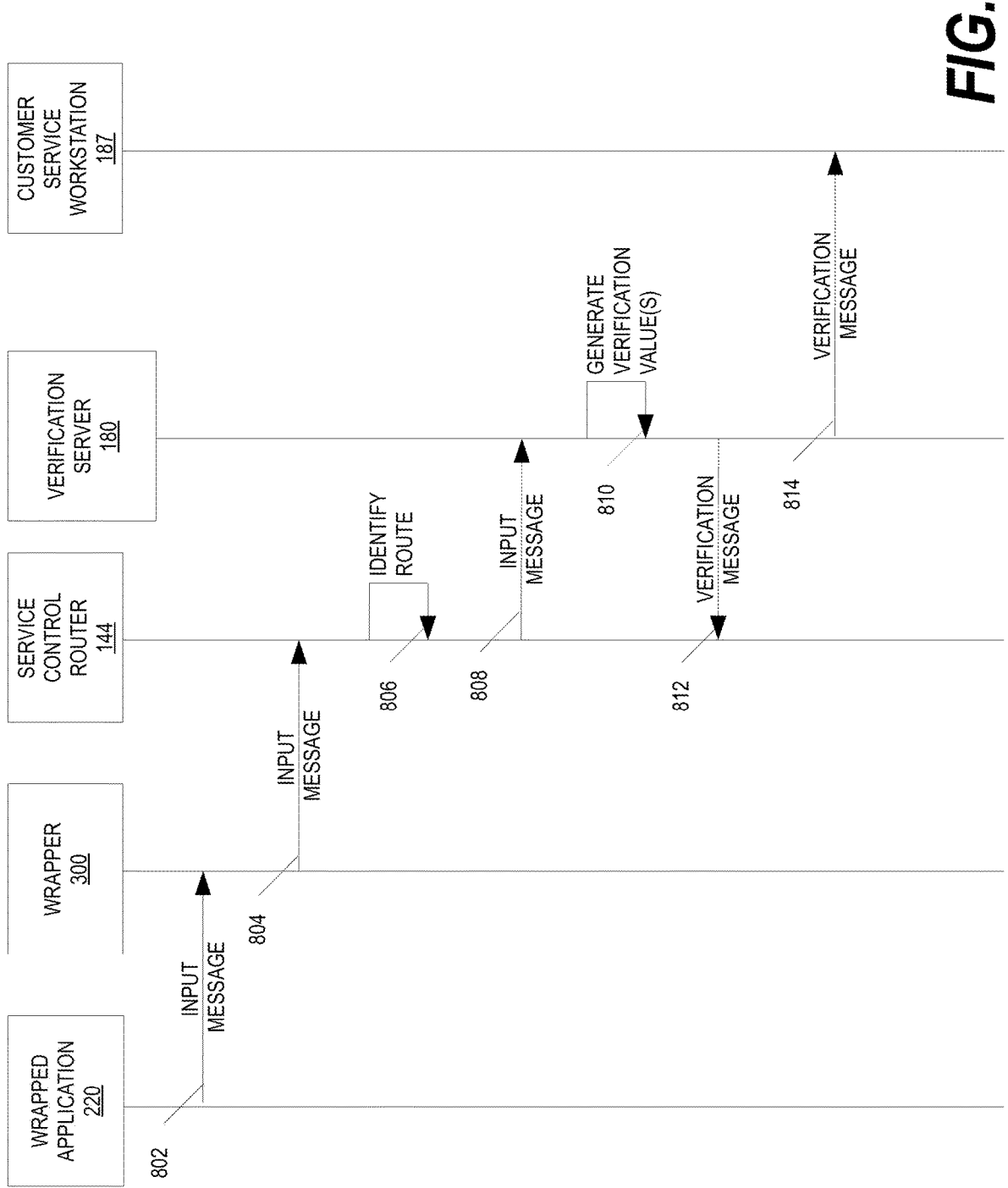
FIG. 8 is a message diagram for receiving inputs from an invoked function of an enhanced customer service wrapped application.

FIG. 8 is a message diagram for receiving inputs from an invoked function of an enhanced customer service wrapped application. The message flow of FIG. 8 shows messages exchanged between several entities which may be included in a communication system. For ease of explanation, the number of entities shown has been limited. However, it will be understood that additional entities may be added or multiple entities combined consistent with the description herein. The message flow in FIG. 8 assumes that an interface or function of the wrapped application 220 has been invoked such as via the messaging shown in FIG. 7.

From the invoked function or interface on the wrapped application 220, one or more input values may be received. The input values may then be provided via message 802 to the wrapper 300. The wrapper 300 may be configured to pass the input message 802 to the network operator server 140 as received from the wrapped application. In some implementations, the wrapper 300 may be configured to collect the input message and format the information in a control response message. It will be appreciated that the wrapper 300 may receive multiple input messages. As such, the wrapper 300 may be configured to aggregate the input messages into a single control response to conserve, for example, transmission bandwidth. The wrapper 300 may also be configured to augment the information included in the input message. For example, the wrapper 300 may be configured to collect device characteristics such as the power level, available bandwidth, memory, hardware configuration, and the like. These characteristics may be included in the message 804.

As shown in FIG. 8, the input message 804 may be processed by the service control router 144. As discussed above, the service control router 144 may be configured to provide the input message to a verification server. Via message 806, the service control router 144 identifies a route for the message. The route may be identified based on the control routes established when the wrapped application was provided, such as is shown in FIG. 4. The route may be selected based on one or more of: the wrapped application transmitting the input message, the function or interface providing the input message, one or more values included in the input message (e.g., pattern matching of sensitive values, XML tags, device characteristics).

Via message 808, the input message is provided to the verification server 180. In some implementations, the service control router 144 may provide the input message received via message 804. In some implementations, the message 808 may be generated by the service control router 144. In generating the message, the service control router 144 may be configured to include additional information in the input message such as routing information, an identifier for the application provider, or other information upon which the verification is based.

Via message 810, the verification server 810 generates one or more verification values. The generation of the verification values may include identifying an input value, applying a verification rule, and providing a result value based on the application of the rule. For example, the verification rule may include a rule for validating a credit card number and ZIP code included in the input message. In some instances, the customer service workstation does not need the actual credit card information, it may be adequate to know that the number provided is valid. Accordingly, the validation response may include a Boolean value identifying the result of the verification. Another example of a verification rule is verifying the input information does not include sensitive information such as social security numbers. The verification may include identifying data that matches a pattern as described above. The verification value from this rule may be a completely or partially redacted number. It will be appreciated that multiple verification values may be generated from a single input message. It will also be appreciated that a verification server may apply multiple verification rules. For example, a social security number may first be processed to ensure the number included in the input message is a valid number and then a second rule may be applied to protect the full number from transmission and/or presentation.

The verification server 180 may provide the generated verification values via message 812 to the service control router 144. The verification message 814 may, in turn, be transmitted to the customer service workstation 187. In some implementations, the verification server 180 may be configured to transmit the verification message to the customer service workstation 187 without the assistance of the service control router 144.

The messaging shown in FIG. 8 illustrates, in one aspect, how an input message received from the wrapped application 220 may be processed to verify the input information. Furthermore, it can be seen how selected input values may be shielded from transmission or display via the customer service workstation 187. For example, in some service sessions, it may be sufficient to obtain a binary determination that the user inputs identify a valid customer. The actual input values may not impact the session short of verifying the identity. As such, the input values may not be needed by the customer service workstation 187, but instead a binary value indicating whether the user identity is verified or not.

Figure 9:
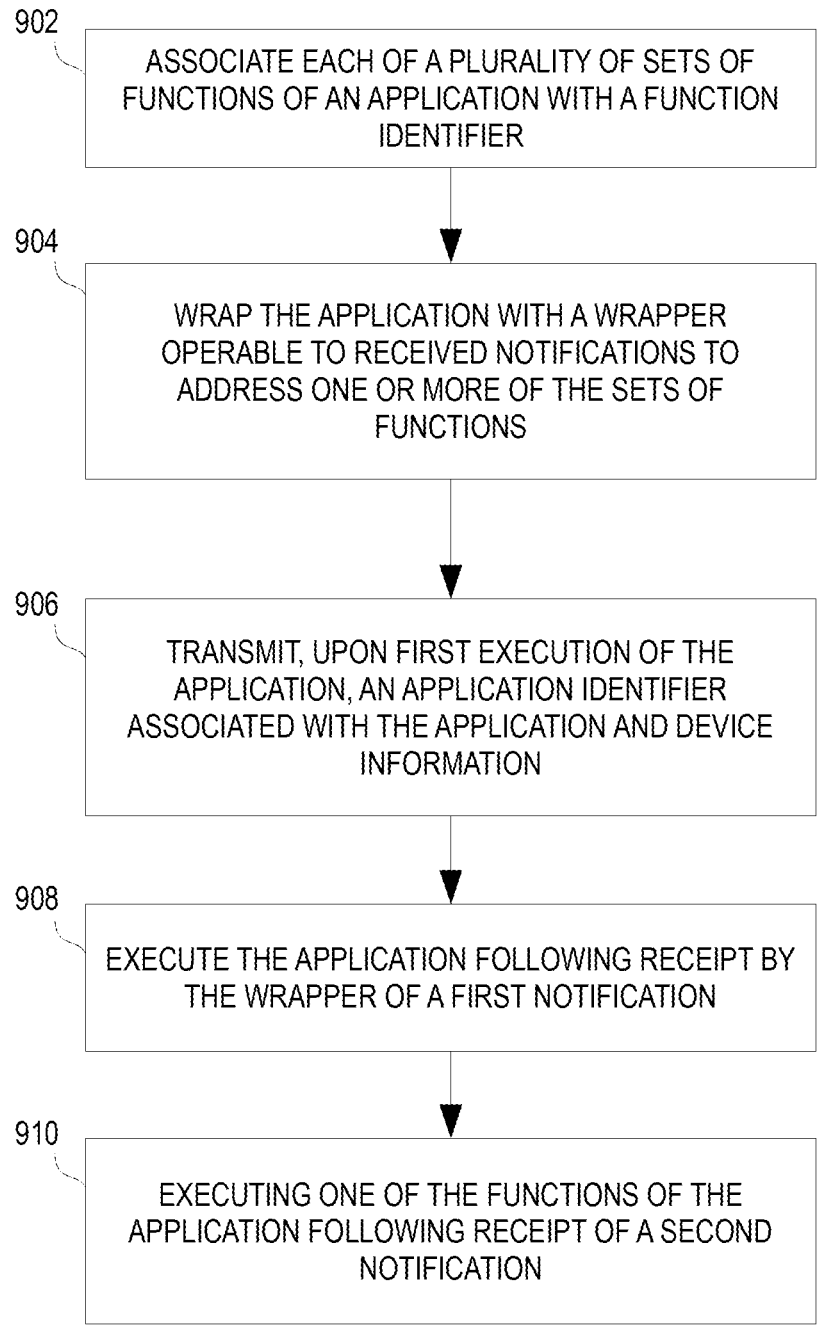
FIG. 9 is a process flow diagram for an example method of execution of an application on a device from a location remote to the device.

FIG. 9 is a process flow diagram for an example method of execution of an application on a device from a location remote to the device. The method shown in FIG. 9 may be implemented via a communication device such as the communication device 200 shown in FIG. 2.

At block 902, via a storage device, each of a plurality of sets of functions of the application are associated with a corresponding function identifier. At block 904, the application is wrapped with a wrapper or container operable to receive notifications from the network operator server 140 issued at one or more locations remote to the device, the notifications addressing one or more sets of functions via the function identifier. The notifications, issued or transmitted for instance by the customer service workstation 187, may be more generally issued by different servers controlling the application on the electronic device 200 remotely. At block 906, upon first execution of the application, an application identifier associated with the application along with device information are transmitted to a remote server. The device information includes at least a device identifier in the network it is operating with. At block 908, the application is executed following receipt by the wrapper of a first notification including the application identifier and the device identifier. The application is executed on the device having a processor. At block 910, one of the functions of the application is executed following receipt of a second notification including the application identifier and the function identifier. The execution of the application and the targeted function are illustrated as two separated steps. In a more generic embodiment, the function identifiers for an application may comprise an indication pointing to the application identifier, so that only one notification is needed. Receiving such an identifier, the wrapper will identify both the application and the function. Thus it may directly execute the application and desired function.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

As used herein, the term "message" encompasses a wide variety of formats for representing information for transmission. A message may include a machine readable aggregation of information such as an XML document, fixed field message, comma separated message, or the like. While recited in the singular, it will be understood that a message may be composed/transmitted/stored/received/etc. in multiple parts.

As used herein an interface (e.g., graphical user interface) may include a web-based interface including data fields for receiving input signals or providing electronic information. The interface may be implemented in whole or in part using technologies such as HTML, Flash, Java, .net, web services, and RSS. In some implementations, the interface may be included in a stand-alone client (for example, thick client, fat client) configured to communicate in accordance with one or more of the aspects described.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An electronic device comprising:
a non-transitory computer-readable medium storing an application and a wrapper associated with the application; and
a processor executing the application and the wrapper, wherein the application performs a plurality of functions each addressable through a respective function identifier and the wrapper receives notifications from a remote server to address one or more of the plurality of functions via their respective function identifiers, wherein when executed by the processor, the wrapper:
sends to the remote server an application identifier associated with the application and device information, upon first execution of the application by the processor, the device information comprising at least a device identifier identifying the electronic device;
and
executes a function of the plurality of functions of the application following receipt of a notification transmitted to the electronic device by the remote server using the device identifier, the notification comprising the respective function identifier of the function,
wherein the received notification is associated with a call from the electronic device to a service provider, and wherein the transmitted notification includes a service session identifier permitting association of the call with data from the wrapped application.

2. The electronic device of claim 1, wherein the functions include one or more of:
displaying a secured input interface;
obtaining and transmitting a characteristic of the application; and
establishing a data communication channel between the application and the server.

3. The electronic device of claim 1, wherein a notification of the received notifications includes an initialization parameter, wherein the wrapper provides the initialization parameter to the execution associated with the notification.

4. The electronic device of claim 3, wherein the initialization parameter comprises a service session identifier indicating an existing communication session for a user associated with the electronic device.

5. The electronic device of claim 1, wherein executing the function comprises:
receiving an input value via the application;
transmitting the input value to a validation server, and
receiving a validation response from the validation server.

6. The electronic device of claim 5, wherein the validation response is transmitted to a location remote to the electronic device, and wherein executing the function comprises transmitting the input value to the location remote to the electronic device.

7. The electronic device of claim 1, wherein the notification also comprises an application identifier, the wrapper being further arranged to:
execute the application corresponding to the application identifier.

8. The electronic device of claim 1, the wrapper being further arranged to:

execute the application following receipt by the wrapper of a first notification prior to the notification comprising the function identifier, the first notification comprising the application identifier.

9. A method of execution of an application on a device having a processor from a location remote to the device, the method comprising:
associating, via a storage device, each of a plurality of functions of the application with a respective function identifier;
wrapping the application with a wrapper operable to receive notifications from a remote server to the device to address one or more of the plurality of functions via their respective function identifiers;
transmitting via the wrapper, upon first execution of the application, to the remote server, an application identifier associated with the application and device information, the device information comprising at least a device identifier identifying the device; and
executing a function of the plurality of functions of the application following receipt by the wrapper of a notification transmitted to the electronic device by the remote server, the notification comprising the respective function identifier of the function,
wherein the received notification is associated with a call from the electronic device to a service provider, and wherein the transmitted notification includes a service session identifier permitting association of the call with data from the wrapped application.

10. The method of claim 9, wherein the functions include one or more of:
displaying a secured input interface;
obtaining and transmitting a characteristic of the application; and
establishing a data communication channel between the application and the remote server.

11. The method of claim 9, wherein the notification includes an initialization parameter, wherein the wrapper provides the initialization parameter to the execution associated with the notification.

12. The method of claim 11, wherein the initialization parameter comprises a service session identifier indicating an existing communication session for a user associated with the application.

13. The method of claim 11, wherein executing the function comprises:
receiving an input value via the application;
transmitting the input value to a validation server, and
receiving a validation response from the validation server.

14. The method of claim 13, wherein the validation response is transmitted to a location remote to the device, and wherein executing the function comprises transmitting the input value to the location remote to the device.

15. A server for remotely controlling an application running on an electronic device, the application capable of performing a plurality of functions available on the electronic device, each function addressable through a respective function identifier, the application being wrapped by a wrapper configured to receive notifications from a remote server to address one or more of the plurality of functions via their respective function identifiers, the server comprising:
a receiver receiving from the wrapper of the electronic device an application identifier associated with the application and a device identifier associated with the electronic device;
a database storing the plurality of functions and corresponding function identifiers associated with the application identifier; and
a processor to:
retrieve, from the database, the plurality of functions based on the received application identifier; and
provide a graphical user interface listing the plurality of functions;
wherein the receiver further receives a selection of a function of the plurality of functions; and the processor further transmits, to the wrapper of the electronic device, a notification for remotely executing the selected function, the notification comprising at least the device identifier and a function identifier associated with the selected function,
wherein the notification is associated with a call from the electronic device to a service provider, and wherein the transmitted notification includes a service session identifier permitting association of the call with data from the wrapped application.

16. The server of claim 15, wherein the plurality of functions include one or more of:
displaying a secured input interface;
obtaining and transmitting a characteristic of the application; and
establishing a data communication channel between the application and the server.

17. The server of claim 16, wherein the initialization parameter comprises a service session identifier indicating an existing communication session for a user associated with the electronic device.

18. The server of claim 15, wherein the notification further includes an initialization parameter.

19. A contextual service function routing device comprising:
a non-transitory computer readable service application registry including service function information for a plurality of electronic client devices; and
a service router to:
receive a call from an electronic client device of the plurality of electronic client device, the device being registered with the service application registry for a wrapped service application identified by an application identifier;
identify a service provider based on information included in the call;
route the call to the identified service provider based on information contained in the service application registry; and
transmit a notification comprising the application identifier to the electronic client device to launch the wrapped service application at the electronic client device, wherein the transmitted notification includes a service session identifier permitting association of the call with data from the wrapped service application.

20. The device of claim 19, wherein the service router further:
receives a notification response from the client device;
generates a message based on the notification response; and
transmits the message to the service provider.

21. The device of claim 20, wherein to generate the message, the service router:
transmits a validation request to a validation server, the validation request including the notification response;
receives a validation response from the validation server; and generates the message based on the validation response, wherein the message does not include a user input value included in the notification response.

\* \* \* \* \*